(12) United States Patent
Pierra et al.

(10) Patent No.: US 11,192,640 B2
(45) Date of Patent: Dec. 7, 2021

(54) SYSTEM FOR EMERGENCY EXTENSION OF AIRCRAFT LANDING GEAR

(71) Applicant: SAFRAN LANDING SYSTEMS, Velizy-Villacoublay (FR)

(72) Inventors: Raphaël Pierra, Velizy-Villacoublay (FR); Mathieu Rousselet, Velizy-Villacoublay (FR); Vincent Pascal, Velizy-Villacoublay (FR); Jean-Luc Belleval, Velizy-Villacoublay (FR)

( * ) Notice: Subject to any disclaimer, the term of this patent is extended or adjusted under 35 U.S.C. 154(b) by 961 days.

(21) Appl. No.: 15/902,869

(22) Filed: Feb. 22, 2018

(65) Prior Publication Data

US 2018/0244374 A1 Aug. 30, 2018

(30) Foreign Application Priority Data

Feb. 24, 2017 (FR) ...................................... 1751504

(51) Int. Cl.
*B64C 25/24* (2006.01)
*F15B 21/10* (2006.01)
(Continued)

(52) U.S. Cl.
CPC .............. *B64C 25/30* (2013.01); *B64C 25/20* (2013.01); *B64C 25/24* (2013.01);
(Continued)

(58) Field of Classification Search
CPC ......... B64C 25/30; B64C 25/20; B64C 25/24; F15B 21/10
See application file for complete search history.

(56) References Cited

U.S. PATENT DOCUMENTS 4,573,649 A * 3/1986 Yourkowski ............ B64C 25/30
244/102 R
9,102,403 B2 * 8/2015 Filho ........................ B64C 25/16
(Continued)

FOREIGN PATENT DOCUMENTS

EP 2312721 A1 4/2011
WO 2011/157834 A2 12/2011

OTHER PUBLICATIONS

Rapport de Recherche Preliminaire / Opinion Ecrite, dated Sep. 4, 2017, issued in corresponding French Application No. 1751504, filed Feb. 24, 2017, 5 pages.

*Primary Examiner* — Brian M O'Hara
(74) *Attorney, Agent, or Firm* — Christensen O'Connor Johnson Kindness PLLC

(57) ABSTRACT

An emergency extension system for extending at least one aircraft undercarriage, the emergency extension system comprising both electromechanical actuators, each electromechanical actuator having an identification component arranged to allocate an identifier to said electromechanical actuator, which identifier depends in particular on a function performed by said electromechanical actuator, and also an electrical card having a delay component arranged to delay actuation of a the electromechanical actuator by an actuation delay that depends on the identifier allocated to the electromechanical actuator, the electromechanical actuators of the emergency extension system thus being arranged to be actuated in succession in an actuation sequence that is defined by the actuation delays.

14 Claims, 5 Drawing Sheets

(51) Int. Cl.
   *B64C 25/30* (2006.01)
   *B64C 25/20* (2006.01)
   *H02J 4/00* (2006.01)

(52) U.S. Cl.
   CPC .......... *B64D 2221/00* (2013.01); *F15B 21/10* (2013.01); *H02J 4/00* (2013.01)

(56) References Cited

U.S. PATENT DOCUMENTS

| | | | |
|---|---|---|---|
| 10,907,660 B2 * | 2/2021 | Jubert | ................... F15B 11/10 |
| 2011/0084550 A1 | 4/2011 | Nierlich et al. | |
| 2013/0082149 A1 * | 4/2013 | Boucaud | .................. H02J 4/00 |
| | | | 244/228 |

* cited by examiner

| PP1 | PP2 | PP3 | PP4 | Function and location of actuators |
|---|---|---|---|---|
| 0 | 0 | 0 | 0 | N/A |
| 0 | 0 | 0 | 1 | Isolation valve |
| 0 | 0 | 1 | 0 | Nose gear fluid flow valve |
| 0 | 0 | 1 | 1 | Main gear fluid flow valve |
| 0 | 1 | 0 | 0 | N/A |
| 0 | 1 | 0 | 1 | Unlock nose hatch |
| 0 | 1 | 1 | 0 | Unlock nose gear |
| 0 | 1 | 1 | 1 | N/A |
| 1 | 0 | 0 | 0 | N/A |
| 1 | 0 | 0 | 1 | Unlock left main hatch |
| 1 | 0 | 1 | 0 | Unlock left main gear |
| 1 | 0 | 1 | 1 | N/A |
| 1 | 1 | 0 | 0 | N/A |
| 1 | 1 | 0 | 1 | Unlock right main hatch |
| 1 | 1 | 1 | 0 | Unlock right main gear |
| 1 | 1 | 1 | 1 | N/A |

Fig. 5

SYSTEM FOR EMERGENCY EXTENSION OF AIRCRAFT LANDING GEAR

FIELD OF THE DISCLOSURE

Embodiments of the present disclosure relate to the field of systems for emergency extension of aircraft landing gear.

BACKGROUND

Modern aircraft are conventionally fitted with an emergency extension system that makes use of gravity for extending landing gear undercarriages when the main extension system has failed. Such an emergency extension system is commonly referred to as a "free-fall" system.

On the Airbus A320, the emergency extension system is a system that is entirely mechanical.

Linkage systems serve to unlock the hatches and the undercarriages while previously opening hydraulic valves and undercarriage actuators and hatches.

On the Airbus A330-A340, the emergency extension system is partially electrified. The linkage between the cockpit and the undercarriage bays has been eliminated. Each bay is fitted with three electric motors. The electric motors actuate a linkage that is present in the bay in order to actuate the hydraulic valves and unlock the hatch and the undercarriage of the bay.

On the Airbus A400M and on the Airbus A380, the linkage has been completely eliminated. The emergency extension system is an "all-electric" system. A centralized computer controls a plurality of electromechanical actuators. When the pilot activates the emergency extension system, the centralized computer begins by powering an electromechanical actuator for actuating an isolation valve, which has two end-of-stroke sensors for informing the centralized computer about the beginning of actuation and the end of actuation. When the centralized computer detects the beginning of actuation, the centralized computer starts a counter. If the counter exceeds a time value that is deemed to be critical, the centralized computer detects that actuation has not been performed correctly. In contrast, if the counter does not exceed the time value that is deemed to be critical, the centralized computer considers that actuation has taken place correctly and orders actuation of the next electromechanical actuator.

SUMMARY

An object of the embodiments of the present disclosure is to reduce the cost and to increase the reliability of an "all-electric" emergency extension system.

In order to achieve this object, the embodiments of the present disclosure provide an emergency extension system for extending an least one aircraft undercarriage, the emergency extension system comprising electromechanical actuators, each electromechanical actuator having an identification component arranged to allocate an identifier to the electromechanical actuator, which identifier depends in particular on a function performed by the electromechanical actuator, and an electrical card having a delay component arranged to delay actuation of a the electromechanical actuator by an actuation delay that depends on the identifier allocated to the electromechanical actuator, the electromechanical actuators of the emergency extension system thus being arranged to be actuated in succession in an actuation sequence that is defined by the actuation delays.

Thus, the actuation sequence enabling the undercarriage to be extended in emergency mode is used without the emergency extension system of the embodiments of the present disclosure including a centralized computer. Since a centralized computer constitutes equipment that is expensive and complex, eliminating the centralized computer reduces costs and significantly increases the reliability of the emergency extension system of the disclosure.

It should be observed that the identification components and the delay component may be components that are simple, and thus inexpensive and reliable.

Embodiments of the present disclosure can be better understood in the light of the following description of a particular non-limiting embodiment of the disclosure.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIG. 5 shows a table for identification by "pin programming";

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

In this example, embodiments of the present disclosure are implemented in an aircraft having landing gear comprising a nose undercarriage, a left main undercarriage, and a right main undercarriage.

The emergency extension system of the disclosure is arranged to extend the nose undercarriage, the left main undercarriage, and the right main undercarriage when a main extension system has failed.

For this purpose, the emergency extension system of the disclosure includes an electromechanical actuator for performing a function of actuating an isolation valve (referred to as the "isolation actuator"), an electromechanical actuator for performing a function of actuating a fluid flow valve for the nose undercarriage (referred to as the "auxiliary flow" actuator), an electromechanical actuator performing a function of actuating a fluid flow valve for the left main undercarriage and for the right main undercarriage (referred to as the "main flow" actuator), an electromechanical actuator performing a function of unlocking a hatch for the nose undercarriage (referred to as the "nose hatch" actuator), an electromechanical actuator performing a function of unlocking a hatch for the left main undercarriage (referred to as the "left main hatch" actuator), an electromechanical actuator performing a function of unlocking a hatch for the right main undercarriage (referred to as the "right main hatch" actuator), an electromechanical actuator performing a function of unlocking the nose undercarriage (referred to as the "nose gear" actuator), an electromechanical actuator performing a function of unlocking the left main undercarriage (referred to as the "left main gear" actuator), and an electromechanical actuator performing a function of unlocking the right main undercarriage (referred to as the "right main gear" actuator).

Figure 1:
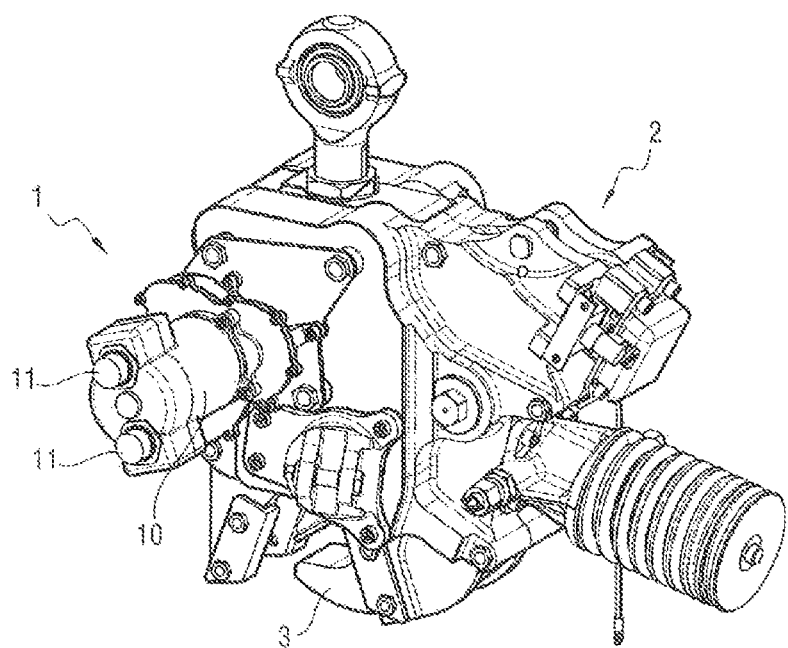
FIG. 1 shows a lock unit and an electromechanical actuator of the emergency extension system of the disclosure, the electromechanical actuator being arranged to perform a function of unlocking a first undercarriage.

With reference to FIG. 1, the nose undercarriage actuator 1 (or left main or right main undercarriage actuator) is integrated in a lock unit 2 having a hook 3 for locking the auxiliary undercarriage (or left main or right main undercarriage) in the retracted (up) position. The nose undercarriage actuator 1 acts on the hook 3 to unlock the nose undercarriage and enable it to be extended when it is appropriate to extend the nose undercarriage and the main extension system has failed.

Figure 2:
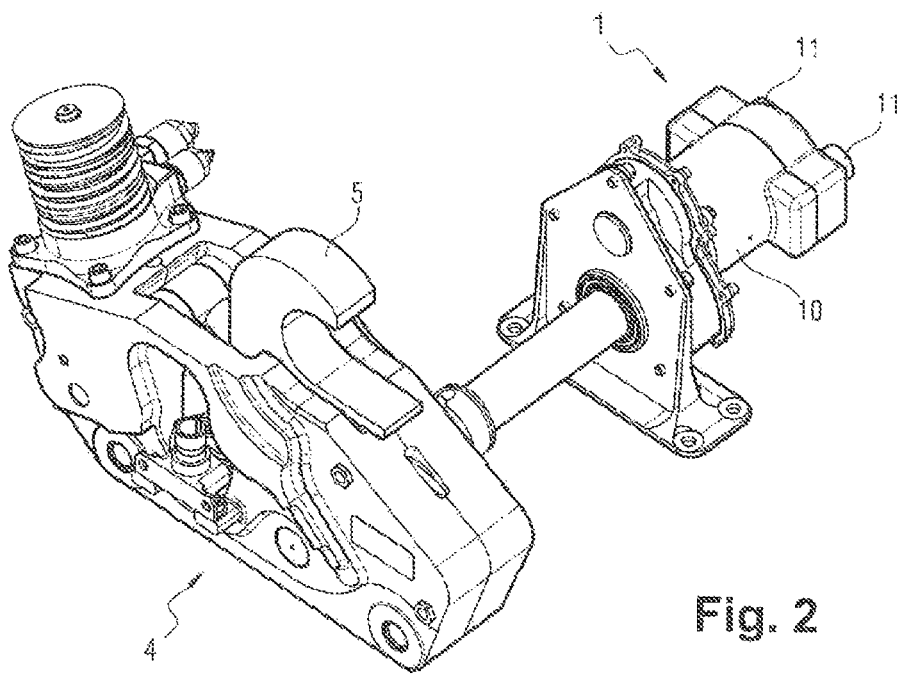
FIG. 2 shows a lock unit and an electromechanical actuator of the emergency extension system of the disclosure, the electromechanical actuator being arranged to perform a function of unlocking a second undercarriage.

With reference to FIG. 2, the nose undercarriage actuator 1 (or the left main or the right main undercarriage actuator) is integrated in a lock unit 4 including a hook 5 for locking the nose undercarriage (or the left main or the right main undercarriage) in the retracted position. The nose undercarriage actuator 1 acts on the hook 5 to unlock the nose undercarriage and enable it to be extended when it is appropriate to extend the nose undercarriage and the main extension system has failed.

The nine above-mentioned electromechanical actuators in this example are identical (and in particular the nose undercarriage actuator 1 is identical to the nose hatch actuator 1).

Each electromechanical actuator 1 has a casing 10, a three-phase electric motor, a drive shaft, two geartrain stages, an actuator member, two electrical connectors 11, and two electrical cards.

It should be observed that certain elements are present in duplicate in the electromechanical actuator, thereby making it possible for the functions performed by these elements to be performed redundantly so as to increase the reliability of the emergency extension system of the disclosure so that it complies with the specifications issued by the main contractor or by subcontractors manufacturing the aircraft.

The three-phase electric motor has a stator with two windings, constituting two windings that are physically segregated. The drive shaft has permanent magnets and thus forms a rotor of the three-phase electric motor that co-operates with the two-winding stator.

The actuator member is driven by the three-phase electric motor and by one of the geartrain stages in order to act on the hook of a lock unit (such as the hook 3 of the lock unit 2 or the hook 5 of the lock unit 4), or on an isolation valve or a flow valve.

Figure 3:
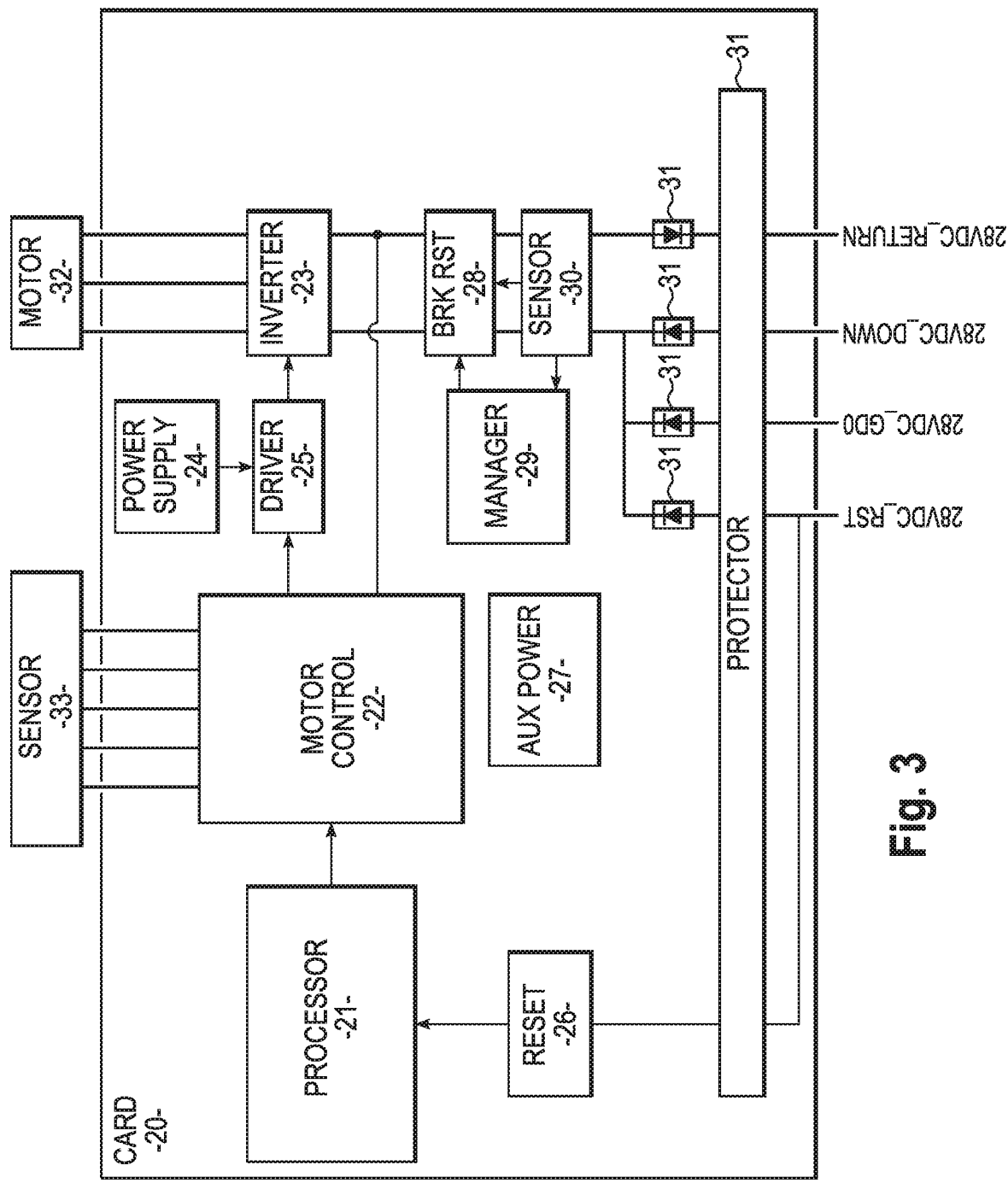
FIG. 3 shows an electrical card integrated in an electromechanical actuator of the emergency extension system of the disclosure.

With reference to FIG. 3, the electrical card 20 includes processor means 21, a motor control component 22, a three-phase inverter 23, an isolated inverter power supply 24, inverter drivers 25, a reset component 26 for resetting the electromechanical actuator, an auxiliary power supply 27, a braking resistance 28, a component for managing the braking resistance 29, sensors 30, and protection components 31.

The processor means 21 comprise a processor component and a delay component, specifically a resistance-capacitance (RC) filter. The role of the RC filter is explained below.

By way of example, the processor component is a microprocessor or a processor or a field programmable gate array (FPGA). The processor component controls the operation of the electromechanical actuator and of the various components of the electrical card 20. In particular, it manages the duration of activation and of deactivation durations for various components of the electrical card 20, and also the speed of rotation of the three-phase electric motor 32 by co-operating with the motor control component 22.

The motor control component 22 receives a speed setpoint for the three-phase electric motor 32 as generated by the processor component 21, and it controls the inverter drivers 25 as a function of this speed setpoint and as a function of measurements of the position of the rotor of the three-phase electric motor 32.

The measurements of the position of the rotor of the three-phase electric motor 32 are produced by position sensors 33 integrated in the three-phase electric motor 32. In this example, the position sensors 33 comprise discrete Hall effect probes.

The reset component 26 is arranged to reset the electromechanical actuator, i.e. to reinitialize the electrical card 20 and put the actuation member back in a rest position.

Figure 4:
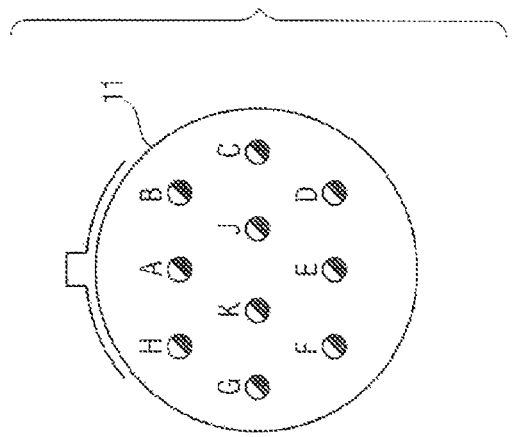
FIG. 4 shows a connector as fitted to each electromechanical actuator of the emergency extension system of the disclosure, together with the allocation of the contacts of the connector.

With reference to FIG. 4, each connector 11 of the electromechanical actuator in this example has ten contacts J1-A, J1-B, J1-C, J1-D, J1-E, J1-F, J1-G, J1-H, J1-J, and J1-K.

As can be seen in the contact allocation table of FIG. 4, the contact J1-B receives an extension power supply 28 VDC_DOWN, the contact J1-H receives a reset power supply 28 VDC_RST, and the contact J1-G receives a maintenance power supply 28 VDC_GDO. All of these power supplies supply 28 volts (V) direct current (DC) from the onboard electricity network. The contact J1-A provides the power supply return 28 VDC_RETURN, i.e. the electric current flowing in the electrical card 20 and in the three-phase electric motor 32 are discharged via the contact J1-A. The contact J1-C is a PP1 pin programming contact, the contact J1-D is a PP2 pin programming contact, the contact J1-E is a PP3 pin programming contact, and the contact J1-F is a PP4 pin programming contact.

Each connector 11 and each electromechanical actuator is connected to a cable having a connector that is complementary to the connector 11. The cable can thus act via the complementary connector and the connector 11 to supply the electrical card 20 with the extension power supply 28 VDC_DOWN, the reset power supply 28 VDC_RST, and the maintenance power supply 28 VDC_GDO, and to return the electric current flowing in the electrical card 20 and in the three-phase electric motor 32.

The states of the PP1, PP2, PP3, and PP4 pin programming contacts are defined by the cable, which thereby gives an identifier to the electromechanical actuator.

It should be observed at this point that using pin programming has the consequence of increasing the size of the connector 11 that is used compared with a connector that does not include any pin programming contacts, but only to a small extent. The increase in the size of the connector 11 is thus typically less than 10 millimeters (mm) for the diameter of the connector 11. The increase in the size of the connector 11 leads to an increase in weight of about 25 grams (g) per electromechanical actuator, which represents less than 2% of the total weight of the electromechanical actuator.

It should also be observed that a disconnector, situated on the onboard electricity network, prevents the extension power supply 28 V DC DOWN and the reset power supply 28 VDC_RST being applied simultaneously to a connector 11.

There follows a more detailed description of the operation of the emergency extension system of the disclosure.

When the electromechanical actuators are installed on the aircraft, an identifier is allocated to each electromechanical actuator by pin programming.

In this example, the identifier is made up of four binary values (0 or 1). Each binary value corresponds to a high signal or a low signal applied by cabling to each of the PP1, PP2, PP3, and PP4 pin programming contacts. FIG. 5 shows the identification table that is used.

It can thus be seen in FIG. 5 that the identifier, which is a function of the pin programming, depends on the function performed by the electromechanical actuator and on the undercarriage that can be extended by the electromechanical actuator.

In summary, the various functions are the function of unlocking a hatch, the function of unlocking an undercarriage, the function of actuating an isolation valve, and the function of actuating a fluid flow valve.

In summary, the various undercarriages are the nose gear, the left main gear, and the right main gear.

The processor component of the electrical card 20 of each electromechanical actuator adjusts the RC filter to define an actuation delay that depends on the identifier of the electromechanical actuator. The RC filter may be adjusted by connecting or disconnecting selectively one or more capacitors or one or more resistors.

Figure 6:
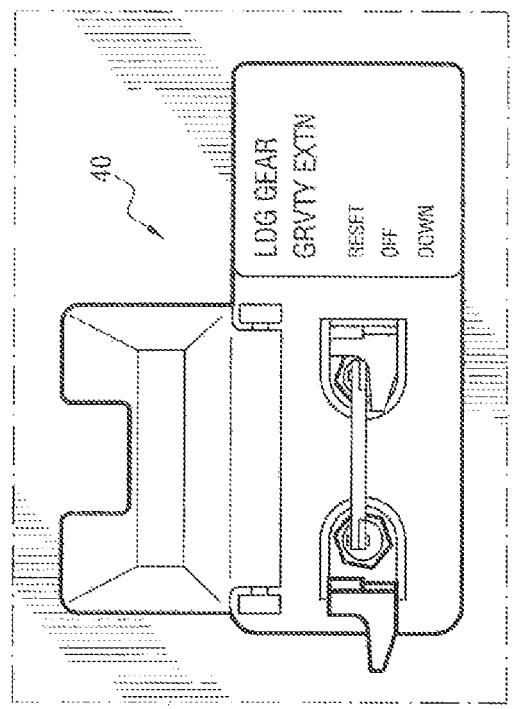
FIG. 6 shows a control lever.

When the pilot of the aircraft decides to cause undercarriages to be extend by using the emergency extension system of the disclosure, the pilot acts on a control lever 40 such as the lever shown in FIG. 6. The control lever 40 is then put in the DOWN position.

Each connector 11 of each electromechanical actuator then receives the extension power supply 28 VDC_DOWN on the contact J1-B.

Receiving the extension power supply 28 VDC_DOWN means that the processor component is to control the extension components involved in extending the associated undercarriage so that the extension components are activated in such a manner as to extend the associated undercarriage. The extension components comprise the three-phase inverter 23, the inverter drivers 25, the insulated inverter power supply 24, etc.

The electrical card 20, and in particular the extension components, and also the three-phase electric motor 32, are then powered by the extension power supply 28 VDC_DOWN.

The processor component causes the electromechanical actuator to be actuated with the actuation delay that depends on the identifier of the electromechanical actuator. The actuation delay is measured from the moment when the electrical card 20 of the electromechanical actuator is powered by the extension power supply 28 VDC_DOWN via the contact J1-B.

Thus, when the pilot of the aircraft seeks to extend the undercarriages by using the control lever 40, the electromechanical actuators of the emergency extension system are actuated in succession in an actuation sequence that is defined by the actuation delay.

Figure 7:
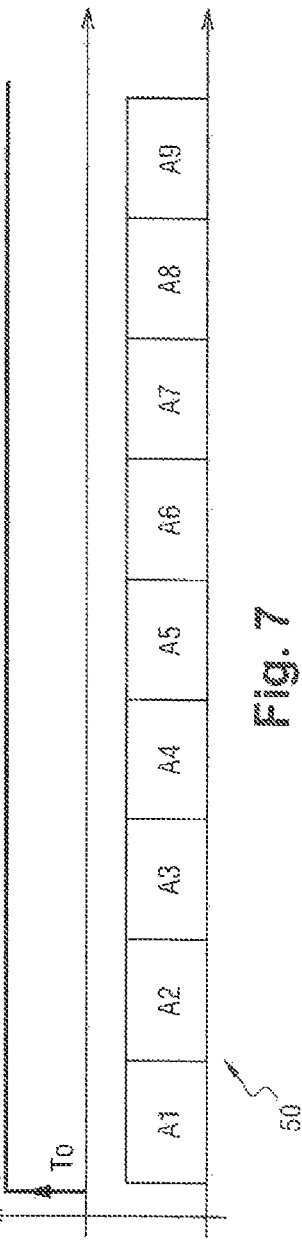
FIG. 7 shows an actuation sequence performed in the emergency extension system of the disclosure.

The actuation sequence 50 can be seen in FIG. 7. The actuation sequence 50 begins at the instant T0 when the emergency extension system of the disclosure is activated.

The isolation actuator is actuated almost immediately (actuation A1), which means that its actuation delay is very short or even zero.

The other electromechanical actuators are then actuated in succession in the following order: nose flow actuator (actuation A2); main flow actuator (actuation A3); nose hatch actuator (actuation A4); left main hatch actuator (actuation A5); right main hatch actuator (actuation A6); nose gear actuator (actuation A7); left main gear actuator (actuation A8); and right main gear actuator (actuation A9). The right main gear actuator thus presents the longest actuation delay.

Each electromechanical actuator is actuated during a predetermined time interval, which in this example is equal to 2 seconds (s). The total duration of the actuation sequence is thus equal to 18 s. Since the maximum time required for emergency extension of landing gear is conventionally set at 30 s, the emergency extension system of the disclosure leaves about 12 s for extending all of the undercarriages, which is an acceptable duration.

It should be observed that it can be advantageous to perform simultaneously the extensions of the nose undercarriage, of the left main undercarriage, and of the right main undercarriage. Under such circumstances, the actuation delays associated with the nose gear actuator, with the left main gear actuator, and with the right main gear actuator are equal.

When an operator decides to reset the electromechanical actuators of the emergency extension system of the disclosure, the pilot acts on the control lever 40. The control lever 40 is then put in the RESET position.

Each connector 11 of the electromechanical actuator then receives the reset power supply 28 VDC_RST on the contact J1-H.

Receiving the reset power supply 28 VDC_RST means that the processor component is to control the reset component 26 so that it resets the electromechanical actuator.

The electrical card 20, and in particular the reset component 26, and also the three-phase electric motor 32, are powered by the reset power supply 28 VDC_RST.

The maintenance power supply 28 VDC_GDO is normally supplied only to the electromechanical actuators that perform a function of unlocking hatches. Hatches are then opened while on the ground, in the context of a maintenance operation.

Receiving the maintenance power supply 28 VDC_GDO means that the processor component is to control the maintenance components of the electrical card 20 that are involved with unlocking hatches.

The electrical card 20, and in particular the maintenance components, and also the three-phase electric motor 32, are powered by the maintenance power supply 28 VDC-GDO.

Naturally, the embodiments of the present disclosure are not limited to the embodiment described, but covers any variant coming within the ambit of the disclosure as defined by the claims.

Although it is stated herein that an RC filter is used as a delay component, it is possible to use some other delay component, e.g. an analog counter. It is also possible to use a different identification component.

Embodiment of the present disclosure naturally apply to any type of aircraft and to any type of undercarriage.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. An emergency extension system for extending at least one undercarriage of an aircraft, the emergency extension system comprising:
    a plurality of electromechanical actuators, each electromechanical actuator having:
        an identification component configured to allocate an identifier to said electromechanical actuator, wherein the identifier depends on a function performed by said electromechanical actuator, and
        an electrical card having a delay component configured to delay actuation of said electromechanical actuator by an actuation delay that depends on the identifier allocated to said electromechanical actuator,
    wherein the plurality of electromechanical actuators are thus configured to be actuated in succession in an actuation sequence that is defined by the actuation delays.

2. The emergency extension system according to claim 1, wherein the system is configured such that the actuation delay of each electromechanical actuator is measured from when the electrical card of the electromechanical actuator is powered.

3. The emergency extension system according to claim 1, wherein the delay component of each electromechanical actuator comprises an RC filter.

4. The emergency extension system according to claim 1, wherein the delay component of each electromechanical actuator comprises an analog counter.

5. The emergency extension system according to claim 1, wherein the identification component of each electromechanical actuator comprises a connector having contacts that are configured to perform identification by pin programming.

6. The emergency extension system according to claim 1, wherein the electrical cards of the plurality of electromechanical actuators are identical.

7. The emergency extension system according to claim 1, wherein the plurality of electromechanical actuators are identical.

8. The emergency extension system according to claim 1, wherein, for each electromechanical actuator, the electrical card includes an extension component and a reset component, and further wherein each electromechanical actuator includes a connector having an extension power supply contact via which the electrical card receives an extension power supply for powering the extension component when the at least one undercarriage is to be extended, and a reset power supply contact via which the electrical card receives a reset power supply for powering the reset component when the electromechanical actuator is to be reset.

9. The emergency extension system according to claim 8, wherein for each electromechanical actuator the electrical card further includes a maintenance component, and the connector has a maintenance power supply contact via which the electrical card receives a maintenance power supply for powering the maintenance component when a maintenance operation is to be performed.

10. The emergency extension system according to claim 9, wherein the extension system is configured to open a hatch while the aircraft is on the ground when the maintenance operation is performed.

11. The emergency extension system according to claim 1, wherein the plurality of electromechanical actuators include an electromechanical actuator configured to perform a function of unlocking a hatch and an electromechanical actuator configured to perform a function of unlocking the at least one undercarriage.

12. The emergency extension system according to claim 1, wherein the plurality of electromechanical actuators include an electromechanical actuator configured to perform a function of actuating an isolation valve and an electromechanical actuator configured to perform a function of actuating a fluid flow valve.

13. The emergency extension system according to claim 1, wherein the emergency extension system is configured to extend a plurality of undercarriages, and the identifier of each electromechanical actuator also depends on which undercarriage said electromechanical actuator is used to extend.

14. The emergency extension system according to claim 1, wherein the plurality of electromechanical actuators include a first electromechanical actuator configured to perform a function of unlocking a nose undercarriage, a second electromechanical actuator configured to perform a function of unlocking a left main undercarriage, and a third electromechanical actuator configured to perform a function of unlocking a right main undercarriage, and further wherein the actuation delays of the first, second, and third electromechanical actuators are equal.

* * * * *